(12) United States Patent
Hoshino

(10) Patent No.: US 12,170,171 B2
(45) Date of Patent: *Dec. 17, 2024

(54) ELECTRONIC COMPONENT

(71) Applicant: Murata Manufacturing Co., Ltd., Nagaokakyo (JP)

(72) Inventor: Yuuta Hoshino, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,505

(22) Filed: Nov. 29, 2023

(65) Prior Publication Data

US 2024/0096556 A1 Mar. 21, 2024

Related U.S. Application Data

(63) Continuation of application No. 17/672,205, filed on Feb. 15, 2022, now Pat. No. 11,887,788, which is a continuation of application No. PCT/JP2020/020973, filed on May 27, 2020.

(30) Foreign Application Priority Data

Aug. 22, 2019 (JP) .................................. 2019-151734

(51) Int. Cl.
*H01G 4/232* (2006.01)
*H01G 4/248* (2006.01)
*H01G 4/30* (2006.01)

(52) U.S. Cl.
CPC ........... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/12; H01G 4/012
See application file for complete search history.

(56) References Cited

U.S. PATENT DOCUMENTS

| | | | | |
|---|---|---|---|---|
| 5,561,587 | A | * 10/1996 | Sanada | ..................... H01B 1/16 361/321.1 |
| 11,887,788 | B2 | * 1/2024 | Hoshino | ................ H01G 4/232 |
| 2007/0242416 | A1 | * 10/2007 | Saito | ..................... H01G 4/2325 361/321.1 |

(Continued)

FOREIGN PATENT DOCUMENTS

| | | |
|---|---|---|
| JP | H03129809 A | 6/1991 |
| JP | H0987419 A | 3/1997 |

(Continued)

OTHER PUBLICATIONS

International Search Report in PCT/JP2020/020973, mailed Sep. 1, 2020, 3 pages.

*Primary Examiner* — Michael P McFadden
(74) *Attorney, Agent, or Firm* — ArentFox Schiff LLP

(57) ABSTRACT

An electronic component that includes: a ceramic body; and an external electrode on a surface of the ceramic body, wherein the external electrode includes: a base layer in contact with the surface of the ceramic body, the base layer including a granulate of a metal material and a continuous phase of a titanium-containing oxide present around the granulate of the metal material; and a plating layer on the base layer.

7 Claims, 9 Drawing Sheets

(56) References Cited

U.S. PATENT DOCUMENTS

| | | | |
|---|---|---|---|
| 2009/0139754 A1* | 6/2009 | Ikarashi | C08G 59/621 |
| | | | 174/257 |
| 2009/0188556 A1 | 7/2009 | Castillo et al. | |
| 2010/0155103 A1 | 6/2010 | Kamikoriyama et al. | |
| 2013/0120898 A1* | 5/2013 | Park | H01G 4/30 |
| | | | 252/514 |
| 2013/0201601 A1* | 8/2013 | Nishisaka | H01G 4/306 |
| | | | 361/301.4 |
| 2013/0258546 A1* | 10/2013 | Kim | H01G 4/30 |
| | | | 156/89.18 |
| 2015/0022940 A1* | 1/2015 | Han | H01G 4/30 |
| | | | 252/514 |
| 2015/0187500 A1* | 7/2015 | Kang | H01G 4/30 |
| | | | 427/79 |
| 2018/0068788 A1 | 3/2018 | Kobayashi | |
| 2018/0286583 A1* | 10/2018 | Onoue | H01G 4/012 |

FOREIGN PATENT DOCUMENTS

| | | |
|---|---|---|
| JP | 2005026479 A | 1/2005 |
| JP | 2017171934 A | 9/2017 |
| WO | 2007108188 A1 | 9/2007 |
| WO | 2016186053 A1 | 11/2016 |

* cited by examiner

ELECTRONIC COMPONENT

CROSS REFERENCE TO RELATED APPLICATIONS

The present application is a continuation of application Ser. No. 17/672,205, filed Feb. 15, 2022, which is a continuation of International application No. PCT/JP2020/020973, filed May 27, 2020, which claims priority to Japanese Patent Application No. 2019-151734, filed Aug. 22, 2019, the entire contents of each of which are incorporated herein by reference.

FIELD OF THE INVENTION

The present invention relates to an electronic component, and more particularly to an electronic component including a ceramic body and an external electrode provided on a surface of the ceramic body.

BACKGROUND OF THE INVENTION

The electronic component may include an external electrode for mounting on a circuit board or the like. In a general electronic component in the related art, an external electrode is formed by applying and firing a conductive paste onto a ceramic body to form a base layer derived from the conductive paste, and plating the base layer.

Due to the demand for miniaturization of the electronic components, external electrodes are also required to be as thin as possible. However, in the electronic component as described above, since the base layer is formed using the conductive paste, there is a limit to the extent that the external electrode can be thinned. In order to cope with such a problem, Patent Document 1 proposes that a base layer in which a metal material is present in a glass material containing silicon atoms in a "highly dispersed state" is formed on a surface of a ceramic body, and an external electrode is formed on the base layer by plating, and this makes it possible to form a thin, uniform, and highly adhesive external electrode. (In Patent Document 1, the term "external electrode" is described separately from the base layer. However, whether or not the external electrode includes a base layer depends on the context, and in the present specification, the term "external electrode" is described as including a base layer.)

Patent Document 1: Pamphlet of International Publication No. WO2016-186053

SUMMARY OF THE INVENTION

In the examples of Patent Document 1, a base layer (referred to as a "highly dispersed state" in Patent Document 1) in which particles of a metal material are "dispersed" in a glass material containing silicon atoms is formed as a sol-gel fired film on a surface of a ceramic body, and a copper plating layer (or, a laminate including a copper plating layer, a nickel plating layer, and a tin plating layer in this order from a base layer) is formed on the base layer.

However, according to the study of the present inventor, it has been found that when an attempt is made to form, as a sol-gel fired film, a base layer in which particles of a metal material are "dispersed" in a glass material containing silicon atoms on the surface of a ceramic body in the same manner as in Examples of Patent Document 1, and then directly form a nickel plating layer on the base layer, a plating layer cannot be appropriately formed. Specifically, when such a ceramic body with a base layer was immersed in a nickel plating solution, a phenomenon was observed in which the surface portion rich in the metal material was not able to be maintained in an original shape and peeled off (or, the plating layer being formed is peeled off together with the surface portion or from the surface portion side of the base layer). The reason for this is not necessarily clear, but it is considered that the metal material is not uniformly "dispersed" over the entire base layer in practice, and the inner portion of the base layer (portion closer to the surface of the ceramic body) is rich in the glass material, whereas the surface portion (portion farther from the surface of the ceramic body) of the base layer is rich in the metal material, and there are few bonding points between the glasses at the interface between the inner portion rich in the glass material and the outer portion rich in the metal material so that the bonding force is not sufficient, and boric acid is added to the raw material composition of the base layer, and boron at three positions present in the glass material due to boric acid causes a decrease in water resistance of the base layer (elution of the glass material). It is considered that the above phenomenon occurred in the nickel plating solution due to the influence of nickel ions, complexing agents contained in the plating solution, additives, and the like, although depending on the pH of the plating solution.

That is, according to the study of the present inventor, it has been found that the base layer in which particles of a metal material are "dispersed" in a glass material containing silicon atoms described in Patent Document 1 does not necessarily have sufficient chemical stability, and there is a problem that a plating layer cannot be appropriately formed on the base layer depending on a plating solution to be used.

An object of the present invention is to provide a novel electronic component including a ceramic body and an external electrode, wherein the external electrode includes a base layer and a plating layer, and the base layer is relatively thin and chemically more stable.

The present inventor has obtained an original idea of using a titanium-containing oxide instead of a glass material containing silicon atoms, and has completed the present invention as a result of further intensive research.

According to one aspect of the present invention, there is provided an electronic component includes: a ceramic body; and an external electrode on a surface of the ceramic body, wherein the external electrode includes: a base layer in contact with the surface of the ceramic body, the base layer including a granulate of a metal material and a continuous phase of a titanium-containing oxide present around the granulate of the metal material; and a plating layer on the base layer.

According to the present invention, there is provided a novel electronic component including a ceramic body and an external electrode, in which the external electrode includes a base layer and a plating layer, and the base layer includes a granulate of a metal material and a continuous phase of a titanium-containing oxide present around the granulate of the metal material, and thereby the base layer can be formed relatively thin and is chemically more stable.

BRIEF EXPLANATION OF THE DRAWINGS

FIGS. 2(a) and 2(b) are enlarged schematic cross-sectional views of a base layer and a vicinity thereof of the electronic component according to the embodiment of the present invention, in which FIGS. 2(a) and 2(b) illustrate an example of a state in which a continuous phase of a titanium-containing oxide exists around a granulate of a metal material in the base layer, and particularly FIG. 2(b) illustrates a case in which a region including only the metal material exists.

FIGS. 3(a) and 3(b) are views for explaining an example of the present invention, in which FIG. 3(a) is a schematic perspective view of a ceramic body, and FIG. 3(b) is a schematic cross-sectional view of a sample in which an external electrode is formed on a surface of the ceramic body.

DETAILED DESCRIPTION OF THE INVENTION

An electronic component according to the present embodiment includes a ceramic body; and an external electrode on a surface of the ceramic body, wherein the external electrode includes: a base layer in contact with the surface of the ceramic body, the base layer including a granulate of a metal material and a continuous phase of a titanium-containing oxide present around the granulate of the metal material; and a plating layer on the base layer.

As long as the electronic component includes a ceramic body and an external electrode on the surface of the ceramic body, the shape, dimensions, and material of the ceramic body, the number, arrangement, shape, and the like of the external electrodes are not particularly limited. The ceramic body may or may not have an internal electrode buried therein, and if present, the internal electrode is electrically connected to the external electrode in an appropriate manner.

The electronic component usable in the present embodiment may be, for example, a surface mounting type, particularly, a chip component, and more specifically, may be a capacitor such as a multilayer ceramic capacitor, an inductor (coil) such as a wound inductor, a film inductor, or a multilayer inductor, a resistor such as a chip resistor, a transistor, an LC composite component, or the like.

Figure 1A:
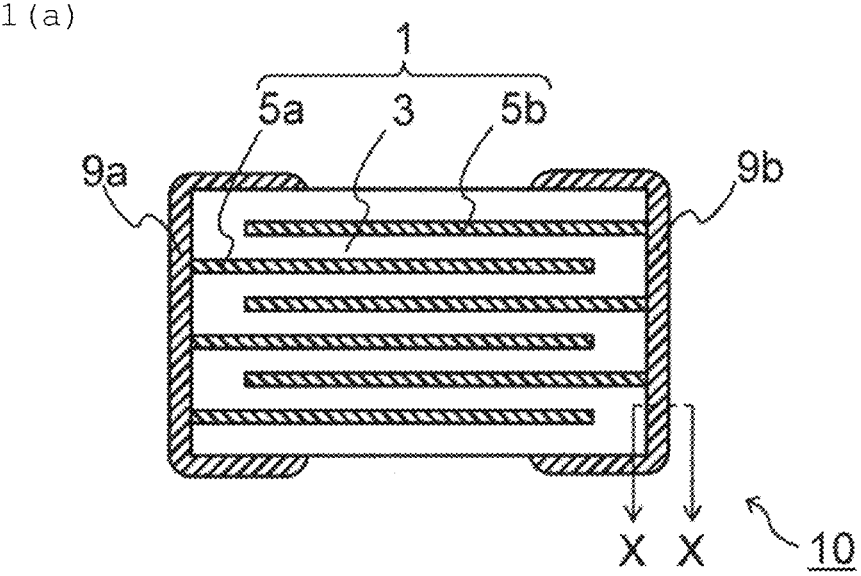
FIG. 1(a) is a schematic cross-sectional view schematically illustrating an exemplary electronic component according to an embodiment of the present invention.

Exemplarily, the electronic component 10 of the present embodiment can be a multilayer ceramic capacitor as illustrated in FIG. 1(a), and includes a ceramic body 1 including a ceramic portion 3 made of a ceramic material and internal electrodes 5a and 5b opposed to each other with the ceramic portion 3 interposed therebetween, and external electrodes 9a and 9b provided on a surface of the ceramic body 1 and electrically connected to the internal electrodes 5a and 5b, respectively. More specifically, the internal electrodes 5a and 5b are embedded in the ceramic body 1, stacked so as to be alternately exposed from opposing end surfaces of the ceramic body 1, and electrically connected to the external electrodes 9a and 9b, respectively. However, the electronic component 10 of the present embodiment is not limited to the one illustrated in FIG. 1(a), and may be various electronic components as described above.

Figure 1B:
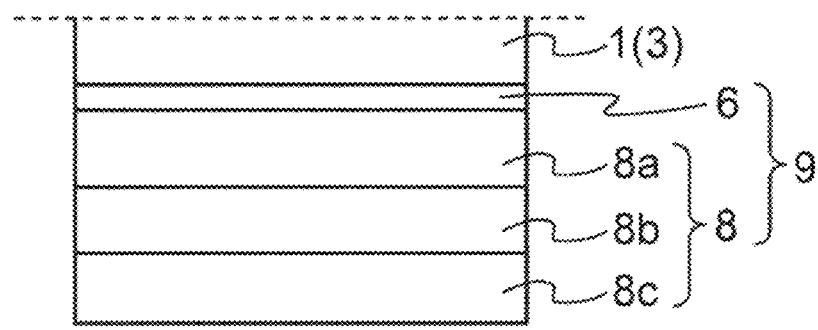
FIG. 1(b) is an enlarged schematic cross-sectional view taken along an X-X plane of FIG. 1(a).

In the electronic component 10 of the present embodiment, as illustrated in FIG. 1(b), the external electrode 9 (corresponding to the external electrodes 9a and 9b exemplified in FIG. 1) includes a base layer 6 in contact with the surface of the ceramic body 1 (mainly corresponding to the ceramic portion 3 exemplified in FIG. 1), and a plating layer 8 formed on the base layer 6.

The material constituting the plating layer 8 is not particularly limited as long as it is conductive, and examples thereof include Ni, Cu, Ag, Sn, and Au. The plating layer 8 may be a single layer or a multilayer. The thickness of the plating layer 8 is not particularly limited, and may be, for example, 100 nm to 10 μm.

Although the present embodiment is not limited, more specifically, the plating layer 8 may include a nickel layer (Ni plating layer) 8a in contact with the surface of the base layer 6 as a single layer or as an innermost layer (layer in contact with the surface of the ceramic body 1) among multiple layers. For example, the plating layer 8 may be a laminate (Ni/Cu/Sn plating layer) including a nickel layer (Ni plating layer) 8a, a copper layer (Cu plating layer) 8b, and a tin layer (Sn plating layer) 8c in this order from the base layer 6.

The nickel layer can effectively prevent "solder leaching" in which the metal material contained in the base layer 6 is lost when the electronic component is soldered and mounted on a circuit board or the like (more specifically, a land or the like). The tin layer can constitute the outermost layer of the external electrode 9, and thereby "solder wettability" is improved when an electronic component is mounted on a circuit board or the like by soldering, and high strength can be obtained at a solder joint. The copper layer can be appropriately provided according to the application of the electronic component.

Figure 2A:
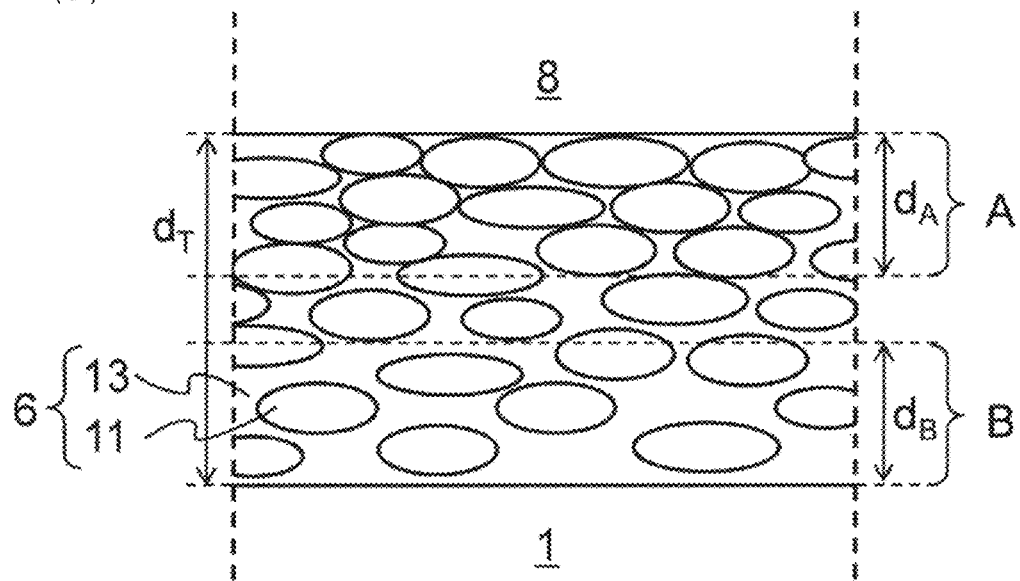
Figure 2B:
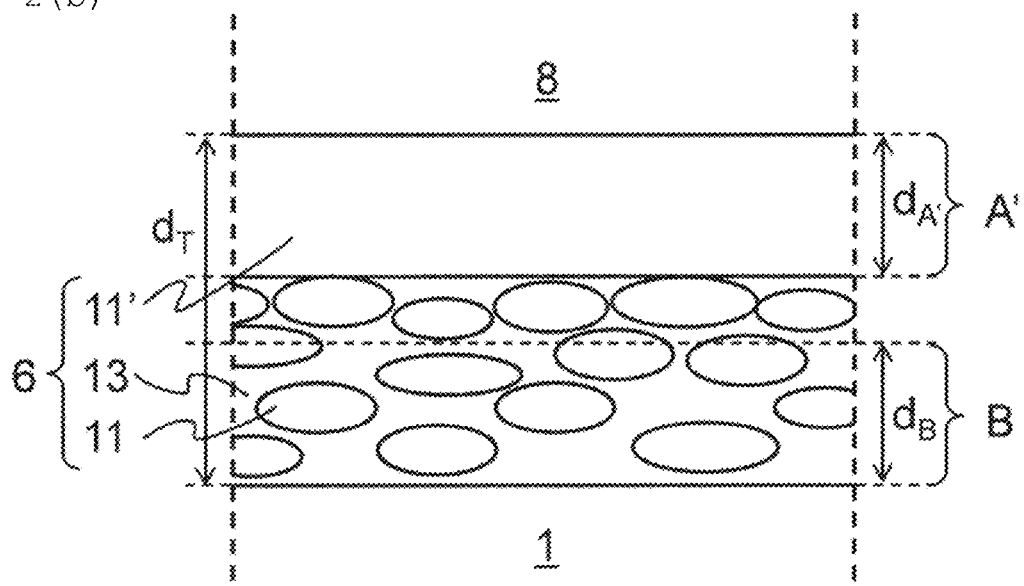

Referring to FIGS. 2(a) and 2(b), the base layer 6 includes a granulate 11 of a metal material and a continuous phase 13 of the titanium-containing oxide present around the granulate 11 of the metal material. (In FIGS. 2(a) and 2(b), the lower side of the base layer 6 is in contact with the surface of the ceramic body 1, and the surface of the base layer 6 on the upper side is in contact with the plating layer 8, which is shown upside down from FIG. 1(b)).

In the base layer 6, the granulate 11 of the metal material can exist in a dispersed manner (as will be described later, there may be a difference in the density of the metal materials, and the density of the metal materials may be substantially uniform over the entire region except for a region including only the metal materials which is present in some cases) in the continuous phase 13 of the titanium-containing oxide, and the granulate 11 of the metal material can be understood as a dispersed phase with respect to the continuous phase 13 of the titanium-containing oxide. In other words, the base layer 6 may be understood as having a sea-island structure formed of "sea" of the continuous phase 13 of the titanium-containing oxide and "island" of the granulate 11 of the metal material. It can also be understood that the metal material is necked by the continuous phase 13 of the titanium-containing oxide and is observed as a granulate 11 of the metal material.

The base layer 6 can be formed sufficiently thinner than the base layer formed using the conductive paste in the related art. For example, the thickness of the base layer formed using a commercially available silver paste as the conductive paste may be about 10 µm. On the other hand, according to the present embodiment, a thickness $d_T$ (refer to FIGS. 2(a) and 2(b)) of the base layer 6 can be, for example, 1.5 µm or less, preferably 0.5 µm or less, and the lower limit is not particularly limited, but can be, for example, 0.04 µm or more. With this, it possible to meet the demand for downsizing of the electronic component, or to increase the dimension of the ceramic body 1 as the thickness of the base layer is thinned while maintaining the dimension of the electronic component.

Furthermore, the base layer 6 is chemically more stable with respect to a plating solution (also referred to as a plating bath), in other words, has high plating resistance. For example, the base layer in which the particles of the metal material are "dispersed" in a glass material containing silicon atoms as described in Patent Document 1 is not chemically stable depending on a plating solution to be used, and more specifically, is not chemically stable with respect to a nickel plating solution, and a nickel plating layer cannot be directly formed thereon. On the other hand, when the plating layer 8 is formed on the base layer 6, although the ceramic body 1 on which the base layer 6 is formed is immersed in a nickel plating solution, nickel plating resistance is exhibited, the base layer 6 can maintain the shape, and the nickel layer 8a can be suitably formed on the base layer 6. The present embodiment is not bound by any theory, but it can be considered that the reason is that (i) a titanium-containing oxide is chemically more stable as compared to a glass material containing silicon atoms, (ii) a granulate 11 of a metal material can be uniformly dispersed with respect to the continuous phase 13 of the titanium-containing oxide (according to another expression, a sea-island structure can be formed) and has high liquid barrier properties, and if applicable, (iii) an initial deposition property of plating is improved due to a flat shape of the granulate 11 of the metal material and/or the high density (although there is a limit) of the metal material on the surface side exposed to the plating solution as described later, so that the plating layer is quickly formed and the liquid barrier properties are improved.

The thickness $d_T$ of the base layer 6 (refer to FIGS. 2(a) and 2(b)) is understood as the distance between the ceramic body 1 and the plating layer 8. The thickness of the base layer can be determined as a thickness measured in the central portion of the base layer using a cross-sectional image obtained by exposing a cross-section of the base layer 6 in the thickness direction and observing the exposed cross section and appropriately analyzing the exposed cross section as necessary. The cross-sectional image may be a SEM image obtained using a scanning electron microscope (SEM), a SIM image obtained using a scanning ion microscope (SIM), a TEM image obtained using a transmission electron microscope (TEM), a SEM/SIM/TEM-EDX image obtained by combining any of these with energy dispersive X-ray analysis (EDX), or the like. The exposed cross section may be obtained by processing an electronic component with a focused ion beam (FIB).

The titanium-containing oxide can be typically titanium dioxide (titania, $TiO_2$), more specifically, a compound having a structure represented by the formula —O—Ti—O— as a main skeleton, but is not limited thereto.

The continuous phase 13 of the titanium-containing oxide means that the continuous phase exists substantially uniformly around the granulate 11 of the metal material (when there is a region made only of a metal material to be described later, the region is excluded) when the distribution of titanium (and oxygen) is observed in the cross-sectional image.

The metal material may be any suitable metal material having electrical conductivity. The metal material is preferably a noble metal because high conductivity can be obtained. More specifically, the metal material contains at least one selected from the group consisting of silver, copper, palladium, and gold.

In the base layer 6, the metal material exists in the form of the granulate 11 of the metal material (refer to FIGS. 2(a) and 2(b)), and may further exist in the form of a region (in other words, the region where the continuous phase of the titanium-containing oxide does not exist) 11' (refer to FIG. 2(b)) made only of the metal material. The thickness of the region 11' including only the metal material may be 0% to 50% of the thickness $d_T$ of the base layer 6.

The granulate 11 of the metal material means that the metal material exists in a particle or particle-like (for example, "cloud") lump when the distribution of the metal material is observed in the cross-sectional image. The granulate 11 of the metal material may or may not be independent particles (may be particles or in a particle-like form) as long as the base layer 6 exhibits conductivity as a whole. The conductivity (or conductive path) may be developed by contact and/or partial bonding between granulates (particles and objects having a particle-like form) of the metal material, and the like.

The granulate 11 of the metal material may have a flat shape (although the present embodiment is not limited, for example, a substantially plate-shaped body) for each particle/particle-like object, as schematically illustrated in FIGS. 2(a) and 2(b), and the longitudinal direction may be aligned substantially parallel to the surface of ceramic body 1. As described above, since the granulate 11 of the metal material is flat and aligned, the base layer 6 can be filled with the granulate 11 of the metal material at a higher filling rate as compared with the case where the granulate of the metal material is spherical, and thereby a lower specific resistance can be realized in the base layer 6. In addition, when the plating layer 8 is formed on the base layer 6, since the surface of the base layer 6 exposed to the plating solution can be parallel to the longitudinal direction of the granulate 11 of the metal material, electrons easily move in the in-plane direction of the surface, so that the initial deposition property of plating can be improved.

In such a granulate 11 of the metal material, the longitudinal direction dimension can be, for example, 20 nm to 150 nm, and preferably 30 nm to 80 nm, and the lateral direction dimension can be (smaller than the longitudinal direction dimension), for example, 10 nm to 60 nm, and preferably 15 nm to 25 nm. When the longitudinal direction dimension and the lateral direction dimension are equal to or less than the upper limits of these ranges, the amount of the continuous phase 13 of the titanium-containing oxide surrounding the granulate 11 of the metal material can be sufficiently secured, and the continuous phase 13 of the titanium-containing oxide can cause the base layer 6 to sufficiently be close contact with/attached to the ceramic body 1 (high adhesiveness/attachment can be obtained). When the longitudinal direction dimension and the lateral direction dimension are equal to or less than the upper limits of these ranges, the amount of the continuous phase 13 of the titanium-containing oxide surrounding the granulate 11 of the metal material is prevented, whereby the granulate 11 of the metal material can be sufficiently secured so as to sufficiently decrease the specific resistance of the base layer 6.

The longitudinal direction dimension and the lateral direction dimension of the granulate of the metal material can be determined based on the cross-sectional image. Specifically, using the cross-sectional image, the ranges of values obtained by measuring the maximum and minimum dimensions for three or more particles/particle-like objects (including those in which the area is approximately maximum, minimum, and near average by visual observation) among the granulates of the metal material present in the base layer can be defined as the longitudinal direction dimension and the lateral direction dimension, respectively.

Referring to FIGS. 2(*a*) and 2(*b*), in the electronic component 10 of the present embodiment, the density of the metal material in the portions A and A' closer to the plating layer 8 of the base layer 6 can be higher than the density of the metal material in the portion B closer to the surface of the ceramic body 1 of the base layer 6. (In other words, the density of the titanium-containing oxide in the portions A and A' closer to the plating layer 8 of the base layer 6 can be lower than the density of the titanium-containing oxide in the portion B closer to the surface of the ceramic body 1 of the base layer 6.) Thus, when the plating layer 8 is formed on the base layer 6, the metal material can exist at a high density on the surface of the base layer 6 exposed to the plating solution and in the vicinity thereof, so that the initial deposition property of plating can be improved, high plating adhesion can be obtained, and the plating layer 8 can be close contact with/attached to the base layer 6 (high adhesiveness/attachment can be obtained). Although the present invention is not limited, in order to obtain higher adhesiveness/attachment, it is preferable that the granulate 11 of the metal material is present over the entire base layer 6 (refer to FIG. 2(*a*)) rather than the region 11' composed only of the metal material is present in the base layer 6 (refer to FIG. 2(*b*)).

The density of the metal material in the portions A and B can also be determined based on the cross-sectional image.

Referring to FIG. 2(*a*), when the granulate 11 of the metal material is present over the entire base layer 6, a thickness $d_A$ of the portion A of the base layer 6 closer to the plating layer 8 can be appropriately set to be in a substantially uniform density range in a range of 50% or less of the thickness $d_T$ of the base layer 6. A thickness $d_B$ of the portion B of the base layer 6 closer to the surface of the ceramic body 1 can be appropriately set so as to be in a range in which the granulate 11 of the metal material exists in a substantially uniform density from the surface side of the ceramic body 1 of the base layer 6 in the remaining portion of the thickness $d_T$ of the base layer 6 excluding $d_A$.

Referring to FIG. 2(*b*), when a region 11' made only of a metal material exists in a portion A' closer to the plating layer 8 of the base layer 6, the thickness $d_A$ of the portion A' closer to the plating layer 8 of the base layer 6 is defined as the thickness of the region 11'. The thickness of the region 11' may be in a range of 1% to 50%, and preferably in a range of 1% to 10% of the thickness of the base layer. A thickness $d_B$ of the portion B of the base layer 6 closer to the surface of the ceramic body 1 can be appropriately set so as to be in a range in which the granulate 11 of the metal material exists in a substantially uniform density from the surface side of the ceramic body 1 of the base layer 6 in the remaining portion of the thickness $d_T$ of the base layer 6 excluding $d_A$.

The electronic component 10 of the present embodiment can be manufactured by, for example, the following method.

First, a ceramic body 1 is prepared. The ceramic body 1 can be prepared by any suitable method.

For example, the ceramic material constituting the ceramic body 1 (more specifically, the ceramic portion 3) is not particularly limited as long as it is a ceramic material used for electronic components. Since the electronic component 10 exemplarily illustrated in FIG. 1(*a*) is a multilayer capacitor, the ceramic material is a dielectric material, and examples thereof include $BaTiO_3$, $CaTiO_3$, $SrTiO_3$, $CaZrO_3$, $(BaSr)TiO_3$, $Ba(ZrTi)O_3$, and $(BiZn)Nb_2O_7$. When present, the material constituting the internal electrodes 5*a* and 5*b* is not particularly limited as long as it is conductive, and examples thereof include Ag, Cu, Pt, Ni, Al, Pd, and Au. The material constituting the internal electrode 8 is preferably Ag, Cu, and Ni.

The ceramic material used in the present embodiment is not limited to the above-described materials, and can be appropriately selected according to the type, configuration, and the like of the electronic component. For example, when the electronic component is a ferrite coil component, the ceramic material may be a ferrite material containing Fe, Ni, Zn, Mn, Cu, or the like. In this case, the ceramic body may include a coil instead of the internal electrode. As long as the coil is finally electrically connected to the external electrode, for example, the coil may be embedded in the ceramic body in advance or wound around the ceramic body before or after the external electrode is formed.

Next, the base layer 6 is formed in a predetermined region of the ceramic body 1 where the external electrodes 9 are to be formed.

First, a raw material composition for forming the base layer 6 is prepared. The raw material composition can be a liquid product in which a titanium compound and a metal salt are dissolved or dispersed in a solvent, and can be a sol in which a polycondensation reaction has started.

The titanium compound may be any starting material that can produce a continuous phase of the titanium-containing oxide. The titanium compound is preferably a titanium alkoxide. The titanium alkoxide can produce a titanium dioxide by a sol-gel method. More specifically, the titanium alkoxide can produce a titanium hydroxide by a hydrolysis reaction and/or a substitution reaction of an alkoxy group by a hydroxyl group, and can produce a titanium dioxide by a polycondensation (dehydration condensation) reaction of the titanium hydroxide. The titanium alkoxide is not particularly limited, and may be titanium (IV) alkoxide ($Ti(OR)_4$, wherein R is any alkyl group), and examples thereof include titanium tetramethoxide, titanium tetraethoxide, titanium tetrabutoxide, tetra-i-propoxytitanium, tetrakis(2-ethylhexyloxy) titanium-i-propoxyoctylene glycolate, and the like.

Examples of the metal salt include nitrates and carboxylates, and nitrates are preferably used. The metal in the metal salt is not particularly limited, and can be appropriately selected according to the metal material described above.

The metal salt may be one kind of a metal salt or a mixture of two or more kinds of metal salts. The metal salt may be solvated, that is, hydrated.

Each content ratio of the titanium compound and the metal salt in the raw material composition can be appropriately selected. Each content ratio of the titanium compound and the metal salt in the raw material composition can be set so that the mass ratio between the metal contained in the metal salt and the titanium-containing oxide converted from titanium contained in the titanium compound is, for example, within the range of 70:30 to 99:1.

The solvent is not particularly limited as long as the titanium compound and the metal salt are dissolved or dispersed well, but alcohols, ethers, glycols, or glycol ethers are preferable.

The raw material composition may contain any suitable reactants, additives, and the like in addition to the titanium compound, the metal salt, and the solvent. Examples of the reactant for obtaining a compound having a structure represented by the formula —O—Ti—O— as a main skeleton by reacting a titanium alkoxide include water and a hydroxy group-containing compound capable of substituting an alkoxy group of a titanium alkoxide with a hydroxyl group. Examples of the additive include a catalyst that promotes such a reaction, a viscosity modifier, a pH modifier, and a stabilizer.

Next, such a raw material composition is applied to a predetermined region of the ceramic body 1 and appropriately dried to form a coating film derived from the raw material composition. The coating method is not particularly limited, and immersion, spraying, screen printing, brushing, inkjet printing, or the like can be used. Drying is performed such that most, preferably substantially all, of the solvent in the raw material composition is removed. More specifically, the drying can be performed by heating the ceramic body applied with the raw material composition, for example, at 25° C. to 200° C. for 5 to 60 minutes.

Next, the ceramic body with the coating film is subjected to a heat treatment to obtain the base layer 6 derived from the coating film. The temperature and time of the heat treatment may be appropriately selected, and may be, for example, 300° C. to 900° C., and preferably 300° C. to 630° C., for example, for 10 to 60 minutes.

During this heat treatment (if applicable, during the drying treatment and the heat treatment), the raw material composition gelates to form a base layer as a sol-gel fired film. More specifically, as a result of the heat treatment, the titanium-containing oxide is formed from the titanium compound, the granulate of the metal material is formed from the metal salt, and the base layer 6 as described above with respect to the electronic component 10 of the present embodiment is formed in contact with the surface of the ceramic body 1. The base layer 6 can be formed sufficiently thinner than the base layer formed using the conductive paste in the related art, and is chemically more stable with respect to a plating solution (plating bath).

According to the base layer formed as the sol-gel fired film in this way, the granulate of the metal material can have a flat shape, and the longitudinal direction thereof can be aligned substantially parallel to the surface of the ceramic body 1. Furthermore, the density of the metal material in the surface portion of the base layer (which is a portion closer to the plating layer) can be higher than the density of the metal material in the portion of the base layer closer to the surface of the ceramic body.

Next, the plating layer 8 is formed on the base layer 6 obtained as described above.

The plating layer 8 is preferably formed by electrolytic plating because the metal material can exist at a high density on the surface side of the base layer 6 (the flat shaped metal material 11 may be present at a high density, and optionally the region 11' made only of the metal material may be present). Electrolytic plating can be performed by immersing the ceramic body 1 on which the base layer 6 is formed in a plating solution (plating bath) and performing plating treatment under predetermined conditions. The plating solution to be used and the conditions of the plating treatment can be appropriately selected according to the type of metal to be plated, the metal material in the base layer, the thickness of the plating film, and the like.

As described above with respect to the electronic component 10 of the present embodiment, since the base layer 6 has nickel plating resistance, although the ceramic body 1 on which the base layer 6 is formed is immersed in a nickel plating solution when the plating layer 8 is formed on the base layer 6, the base layer 6 can maintain the shape thereof, and the nickel layer 8a can be suitably formed on the base layer 6. The plating layer 8 can be appropriately formed over the entire exposed surface of the base layer 6. When the multi-layered plating layer 8 (for example, the nickel layer 8a, the copper layer 8b, and the tin layer 8c) is formed, the plating treatment can be performed in multiple stages.

With this, the electronic component 10 of the present embodiment is manufactured.

Although one embodiment of the present invention has been described above, the present invention is not limited to the embodiment, and various modifications can be made.

EXAMPLES

In the following examples and comparative examples, a ceramic body for a wound inductor is used on the assumption that the electronic component is a wound inductor, but these results similarly apply to other electronic components.

Example 1

Figure 3A:
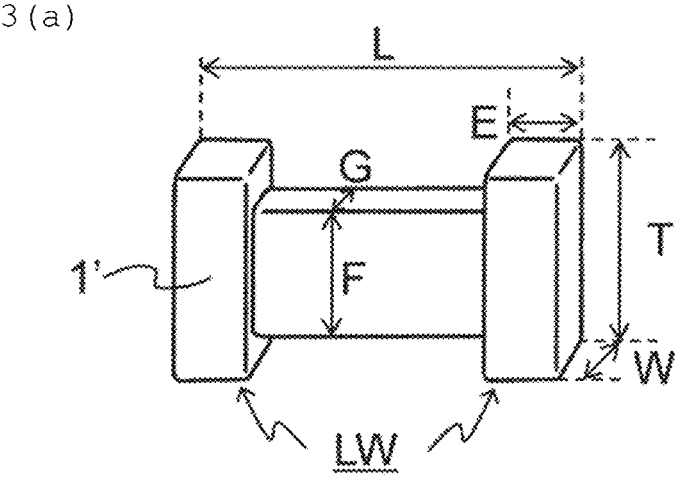

First, a ceramic body 1' for a wound inductor was prepared. The ceramic body 1' was made of a ferrite material and had a shape as schematically illustrated in FIG. 3(a). The dimensions of this ceramic body 1' were as follows: L=0.70 mm, W=0.30 mm, T=0.50 mm, E=0.30 mm, F=0.32 mm, G=0.29 mm.

Formation of Base Layer

A raw material composition 1 (paste) was prepared by mixing the components shown in Table 1 in a predetermined mass. From the composition of the raw material composition 1, the mass ratio of silver (metal) contained in silver nitrate to titanium dioxide ($TiO_2$) converted from titanium contained in titanium (IV) tetrabutoxide (monomer) was obtained to be 94.9:5.1. (Since the amount of aluminum in the aluminum nitrate nonahydrate is very small, it was not considered as an additional metal when the mass ratio was obtained.)

TABLE 1

| Component | Raw material composition 1 Mass (g) |
|---|---|
| 2-methoxyethanol | 8.736 |
| Aluminum nitrate nonahydrate | 0.047 |
| Titanium (IV) tetrabutoxide (monomer) | 0.481 |
| Silver nitrate | 3.277 |
| Hydroxypropyl cellulose | 2.882 |

Next, the raw material composition 1 was applied to a lower LW surface of the ceramic body 1' (refer to FIG. 3(a)) and the outer periphery thereof, and dried at 150° C. for 30 minutes in an air atmosphere (normal pressure) to form a coating film derived from the raw material composition 1.

Figure 6:
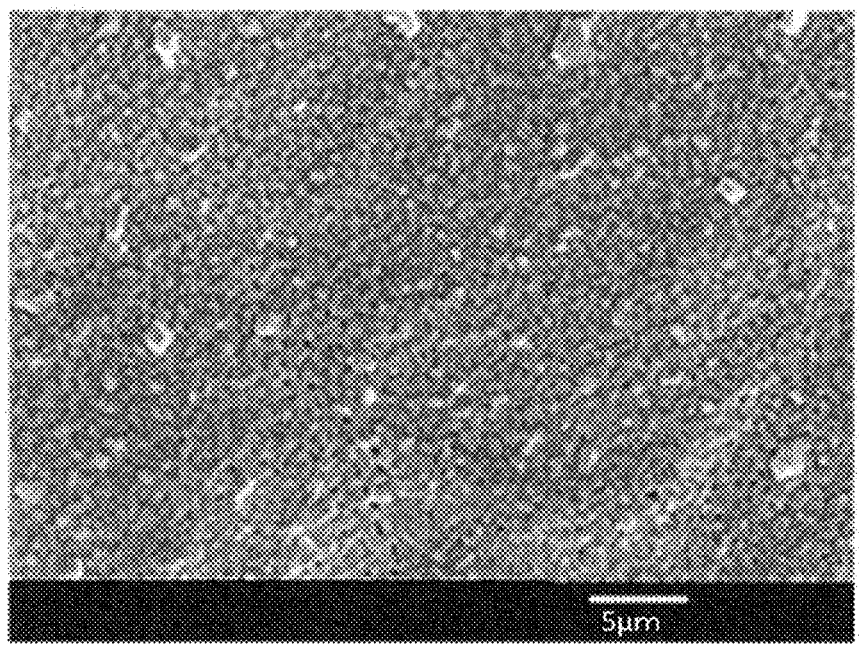
FIG. 6 illustrates an SEM image of an exposed surface (before plating treatment) of the base layer formed in Example 1 of the present invention.

Thereafter, the ceramic body 1' with the coating film was subjected to a heat treatment at 535° C. for 30 minutes under an air atmosphere (normal pressure) to form a base layer derived from the coating film. It is understood that the obtained base layer contains a compound having a structure represented by the formula —O—Ti—O— as a main skeleton as the titanium-containing oxide. FIG. 6 illustrates a SEM image of the obtained exposed surface of the base layer.

Formation of Plating Layer

The ceramic body 1' with a base layer thus obtained was used to form a Ni/Cu/Sn plating layer as a plating layer on the base layer by electrolytic plating. The plating bath and treatment conditions used in the electrolytic plating are shown in Table 2.

TABLE 2

|  | Ni plating | Cu plating | Sn plating |
| --- | --- | --- | --- |
| Plating bath | Wat bath (pH = 4.2) | Pyrophosphate bath (pH = 8.6) | Neutral bath (pH = 6.5) |
| Bath temperature (° C.) | 60 | 55 | About 25 (room temperature) |
| Current value (A) | 10 | 10 | 5 |
| Plating time (minutes) | 60 | 80 | 90 |

Figure 3B:
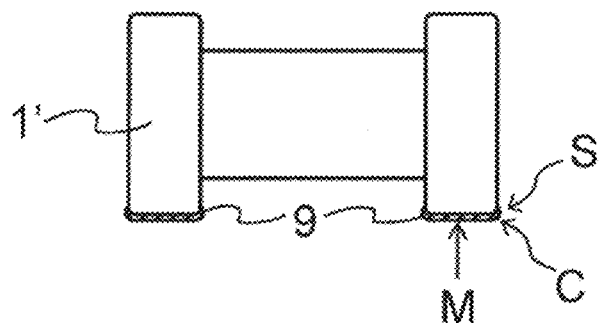

As a result, as illustrated in FIG. 3(b), a sample was obtained, in which the external electrode 9 formed of the base layer and the plating layer formed thereon was provided on the surface of the ceramic body 1'. The external electrode 9 covered the LW surface of the ceramic body 1' and the outer periphery thereof. In FIG. 3(b), symbols M, C, and S mean a central portion, a corner portion, and an outer peripheral portion of the external electrode, respectively.

Evaluation

The samples obtained according to the present example were evaluated as follows.

A cross section of the sample of the present example was observed using a SEM apparatus. From the obtained SEM image, the thickness of the base layer was 128 nm at a central portion M, 70 nm at a corner portion C, and 53 nm at an outer peripheral portion S. The results (central portion) are also shown in Table 3. The thickness of the base layer formed using a commercially available silver paste as the conductive paste was able to be about 10 μm, whereas the base layer in the sample of the present example was able to be thinned to about 1/80 thereof.

Figure 4:
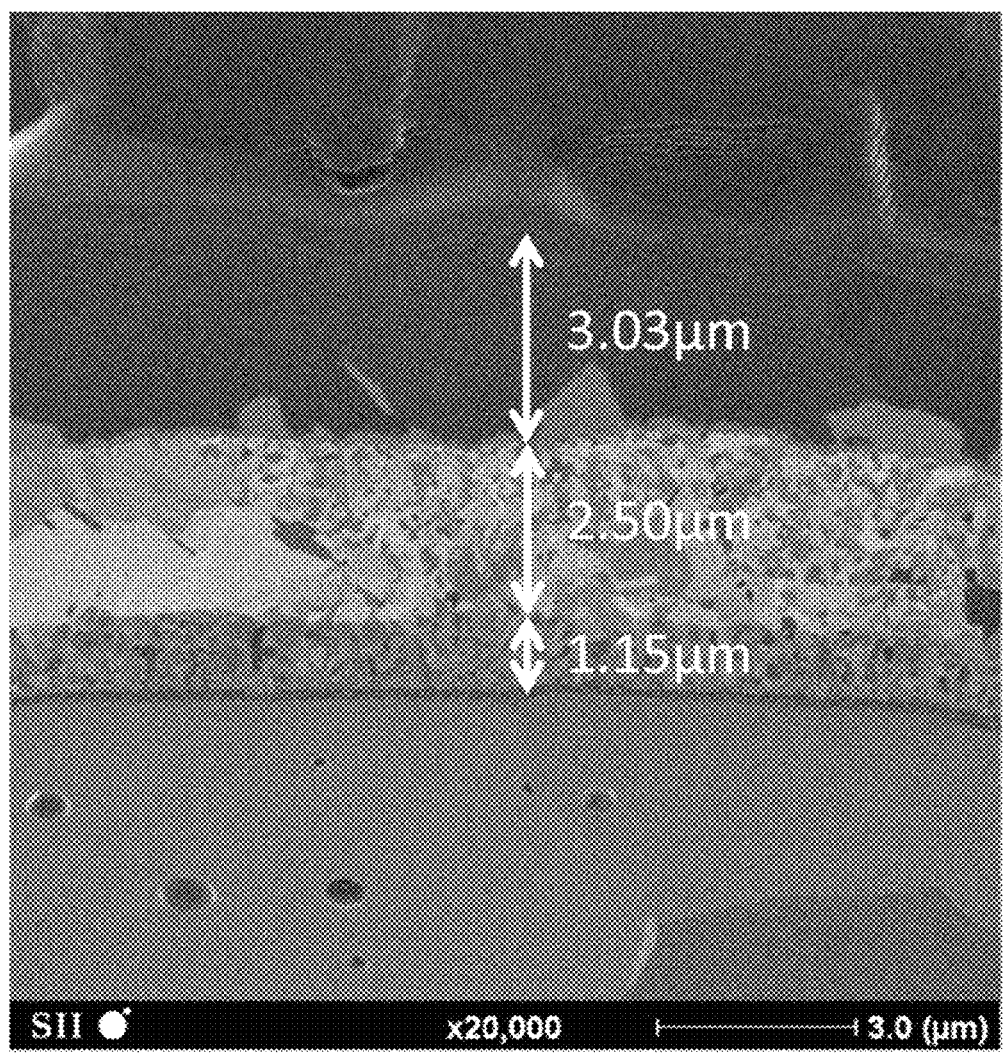
FIG. 4 illustrates a SIM image of a cross section of a base layer and a plating layer located at a central portion of an external electrode of a sample prepared in Example 1 of the present invention.

In addition, using a FIB/SIM-EDX analyzer, the sample of the present example was processed by FIB (HELIOS NANORAB 660 i manufactured by FEI) to expose the cross sections in the thickness direction of the base layer and the plating layer, and the exposed cross sections were observed and analyzed. As a result, it was confirmed from a SIM image (FIG. 4) and a SIM-EDX image (not shown) concerning each element that a plating layer was formed by stacking a nickel layer, a copper layer, and a tin layer in this order on the base layer. Referring to FIG. 4, the thickness of each layer of the plating layer was 1.15 μm for a Ni layer, 2.50 μm for a Cu layer, and 3.03 μm for a Sn layer in the central portion M. In FIG. 4, the lower side is ceramic body 1', and the upper side is a plating layer. The results (central portion) are also shown in Table 3.

Figure 5:
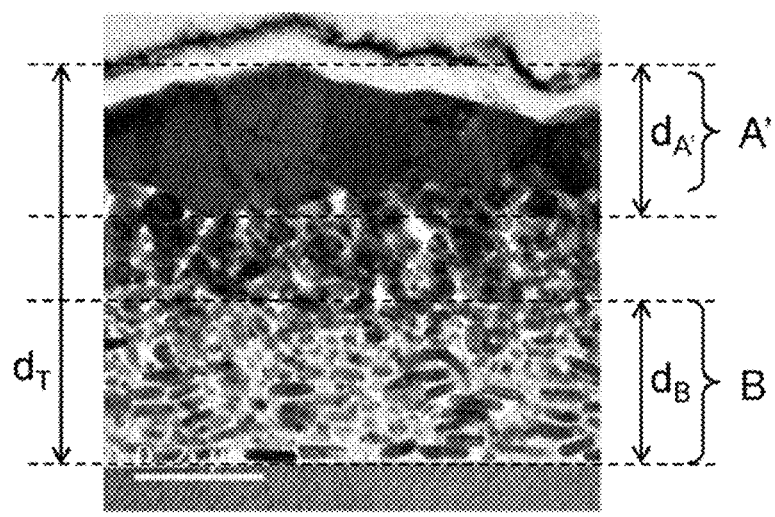
FIG. 5 illustrates a TEM image of a cross section of the base layer in the sample prepared in Example 1 of the present invention, and the results of examining distributions of Ti and Ag from the TEM image by EDX analysis (a scale bar in the TEM image shown in an upper part of FIG. 5 is 0.2 μm).
Figure 5:
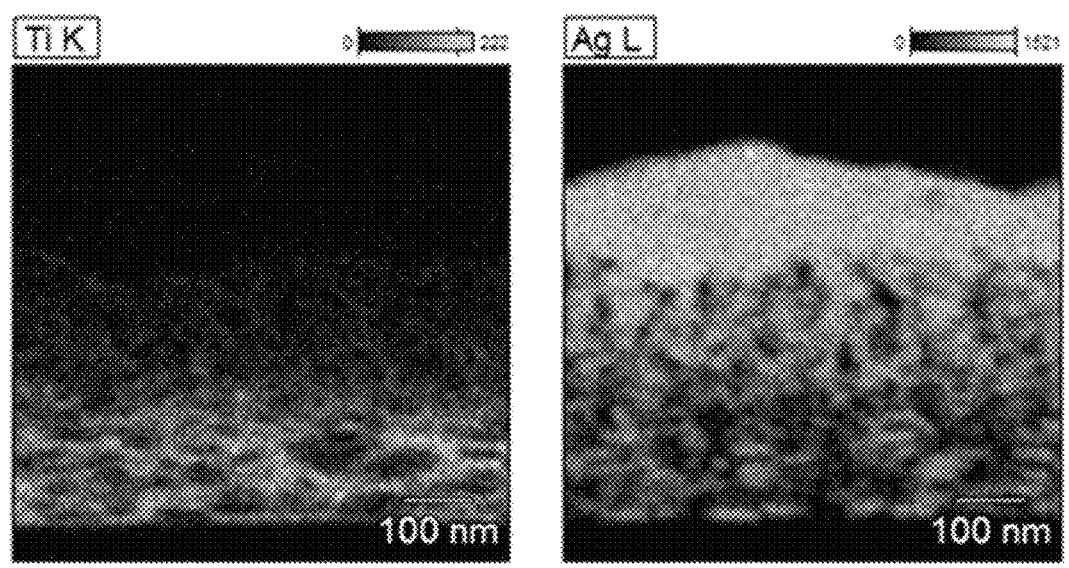

Further, using a TEM-EDX apparatus (FE-TEM JEM-2200 FS (manufactured by JEOL Ltd.)/analysis system NORAN System 7 (manufactured by Thermo Fisher Scientific)), the sample of the present example was processed to expose the cross section of the base layer in the thickness direction, and the exposed cross section was observed and analyzed. The obtained TEM image and TEM-EDX images of Ti and Ag are illustrated in FIG. 5. In FIG. 5, the lower side is ceramic body 1', and the upper side is a plating layer.

As understood from the TEM-EDX image of the base layer illustrated in FIG. 5, it was confirmed that titanium existed around the Ag granules in the base layer (it is understood that this titanium forms a titanium-containing oxide). The Ag granules had a longitudinal direction dimension of about 32 to 81 nm and a lateral direction dimension of about 16 to 22 nm. The results are also shown in Table 3. Further, from FIG. 5, it was found that the density of Ag in the portion A' closer to the plating layer of the base layer was higher than the density of Ag in the portion B closer to the surface of the ceramic body of the base layer. The thickness dm of the portion A' where the density of Ag was high was about 39% of the thickness $d_T$ of the base layer, and the thickness $d_B$ of the portion B was about 39% of the thickness $d_T$ of the base layer. In this portion A', Ag is present in a lump and appears to be formed of only Ag. The continuous phase of the titanium-containing oxide is present in the remaining portion of about 61% of the thickness excluding the portion A' from the base layer.

Example 2

Figure 8:
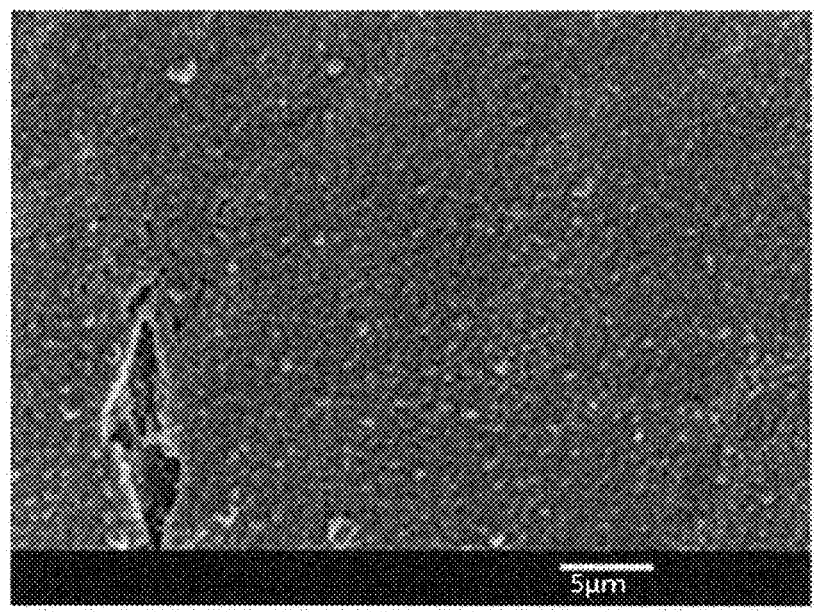
FIG. 8 illustrates an SEM image of an exposed surface (before plating treatment) of the base layer formed in Example 2 of the present invention.

A base layer was formed on the surface of the ceramic body in the same manner as in Example 1 except that the heat treatment temperature was 435° C. FIG. 8 illustrates a SEM image of the obtained exposed surface of the base layer.

The ceramic body 1 with a base layer thus obtained was used to form a plating layer on the base layer by electrolytic plating in the same manner as in Example 1. As a result, a sample was obtained, in which the external electrode formed of the base layer and the plating layer formed thereon was provided on the surface of the ceramic body.

The samples obtained according to the present example were evaluated in the same manner as in Example 1. The results of measuring the thickness of the base layer and the thickness of the plating layer (Ni/Cu/Sn plating layer) at the central portion of the external electrode formed as described above are shown in Table 3.

Figure 7:
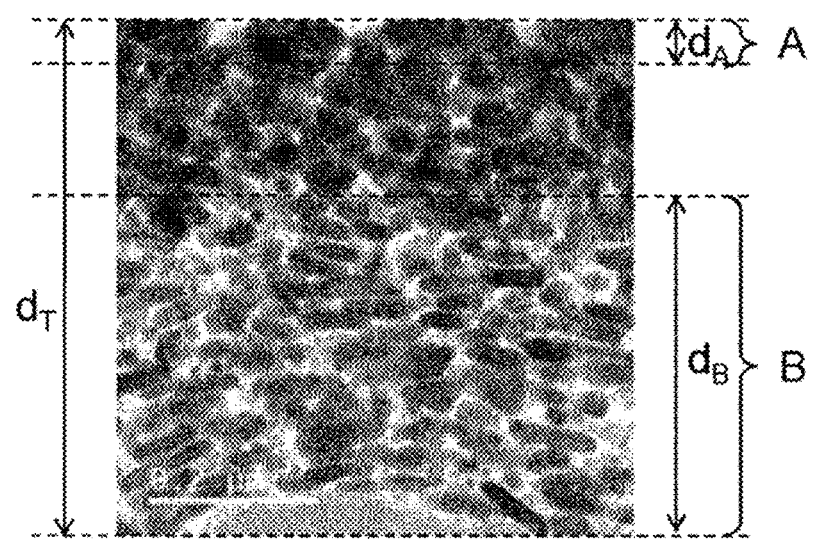
FIG. 7 illustrates a TEM image of a cross section of the base layer in the sample prepared in Example 2 of the present invention, and the results of examining distributions of Ti and Ag from the TEM image by EDX analysis (a scale bar in the TEM image shown in an upper part of FIG. 7 is 0.2 μm).
Figure 7:
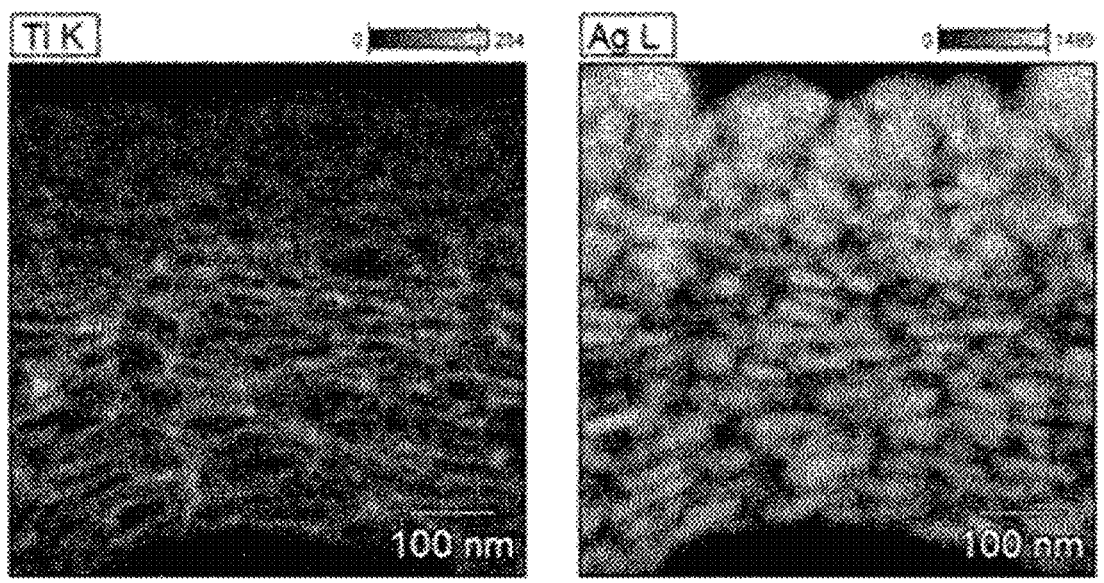

As understood from the TEM-EDX image of the base layer illustrated in FIG. 7, it was confirmed that titanium existed around the Ag granules in the base layer (it is understood that this titanium forms a titanium-containing oxide). The Ag granules had a longitudinal direction dimension of about 43 to 142 nm and a lateral direction dimension of about 17 to 52 nm. The results are also shown in Table 3. Further, from FIG. 7, it was found that the density of Ag in the portion A' closer to the plating layer of the base layer was higher than the density of Ag in the portion B closer to the surface of the ceramic body of the base layer. The thickness $d_A$ of the portion A where the density of Ag was high was about 8% of the thickness $d_T$ of the base layer, and the thickness $d_B$ of the portion B was about 66% of the thickness $d_T$ of the base layer. In this portion A, Ag exists in a lump, and it seems to form a granulate of Ag or to be formed of only Ag (in other words, it is the portion A'). The continuous phase of the titanium-containing oxide is present in the remaining portion of about 82% of the thickness excluding the portion A from the base layer.

Examples 3 and 4

Figure 9:
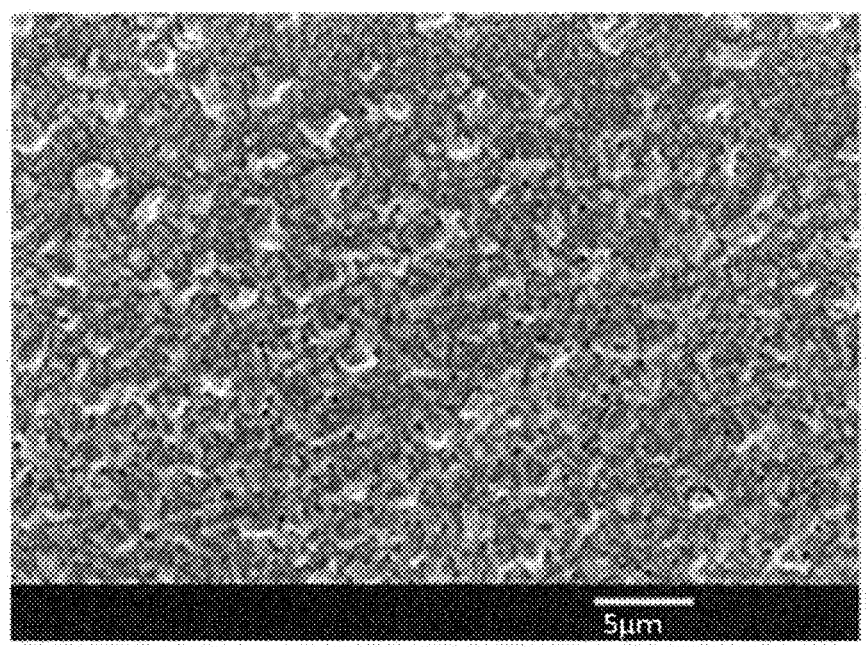
FIG. 9 illustrates an SEM image of an exposed surface (before plating treatment) of the base layer formed in Example 4 of the present invention.

A base layer was formed on the surface of the ceramic body in the same manner as in Example 1 except that the heat treatment temperature was 335° C. and 635° C. (Examples 3 and 4, respectively). FIG. 9 illustrates a SEM image of the obtained exposed surface of the base layer obtained in Example 4.

The samples obtained according to the present Examples 3 and 4 were evaluated in the same manner as in Example 1. The results of measuring the thickness of the base layer and the thickness of the plating layer (Ni/Cu/Sn plating layer) at the central portion of the external electrode formed as described above are shown in Table 3. In Examples 3 and 4, the measurement of the longitudinal direction dimension and the lateral direction dimension of the Ag granulate was omitted (in Table 3, "–" means "not measured").

Also in the samples obtained according to Examples 3 and 4, it was confirmed that titanium was present around the Ag granules in the base layer (it is understood that this titanium forms a titanium-containing oxide). Further, from FIG. 7, it was found that the density of Ag in the upper portion closer to the plating layer of the base layer was higher than the density of Ag in the lower portion closer to the surface of the ceramic body of the base layer.

TABLE 3

| | | Example 1 | Example 2 | Example 3 | Example 4 |
|---|---|---|---|---|---|
| Heat treatment temperature (° C.) | | 535 | 435 | 335 | 635 |
| Base layer (nm) | | 128 | 660 | 270 | 420 |
| Plating layer ($\mu$m) | Ni layer | 1.15 | 2.34 | 1.32 | 1.41 |
| | Cu layer | 2.50 | 3.66 | 3.02 | 2.88 |
| | Sn layer | 3.03 | 5.37 | 3.48 | 3.62 |
| Dimension of Ag granulate (nm) | Longitudinal direction | 32-81 | 43-142 | — | — |
| | Lateral direction | 16-22 | 17-52 | — | — |

Comparative Example 1

Figure 10:
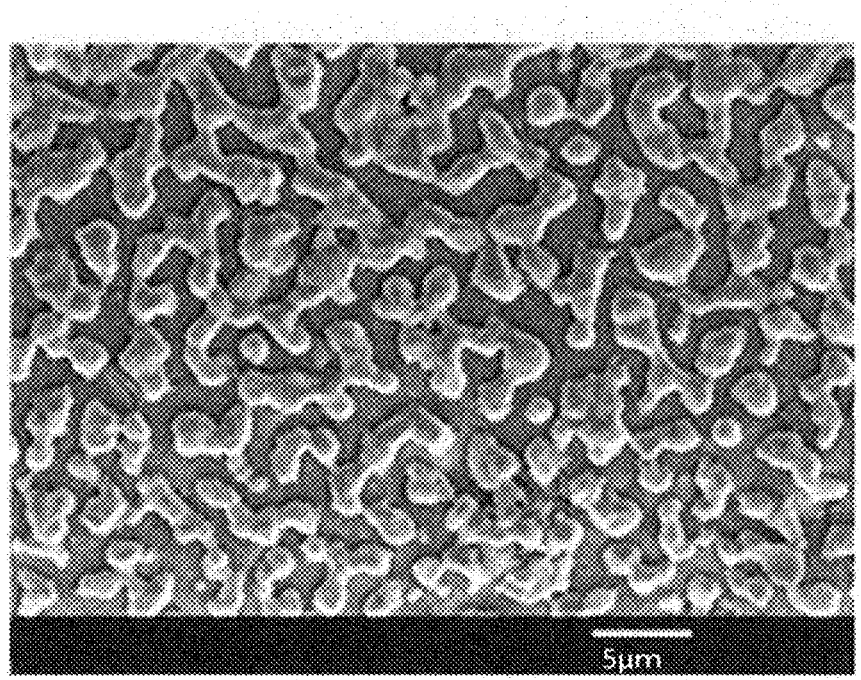
FIG. 10 illustrates an SEM image of an exposed surface (before plating treatment) of the base layer formed in Comparative Example 1 of the present invention.

A base layer was formed on the surface of the ceramic body in the same manner as in Example 1 except that the heat treatment temperature was 735° C. FIG. 10 illustrates a SEM image of the obtained exposed surface of the base layer.

An attempt was made to form a plating layer on the base layer by electrolytic plating in the same manner as in Example 1 by using the ceramic body with a base layer thus obtained. However, when Ni plating was first attempted in the same manner as in Example 1, Ni was only deposited in part, and the Ni plating layer was able to be appropriately formed over the entire exposed surface of the base layer.

This is considered to be because, as understood by comparing the SEM image (Comparative Example 1) of the exposed surface of the base layer illustrated in FIG. 10 with the SEM images (Examples 1, 2 and 4) illustrated in FIGS. 6, 8, and 9, Ag balls are formed on the surface in Comparative Example 1, and Ag cannot be uniformly dispersed in the titanium-containing oxide.

Since the external electrode can be thinned, the electronic component of the present invention can be downsized, and furthermore, is chemically stable with respect to a plating solution, that is, has high plating resistance (particularly, nickel plating resistance) and high reliability, and thus can be suitably used in various electronic devices.

DESCRIPTION OF REFERENCE SYMBOLS

1: Ceramic body
3: Ceramic portion
5a, 5b: Internal electrode
6: Base layer
8, 8a, 8b, 8c: Plating layer
9, 9a, 9b: External electrode
10: Electronic component
11: Granulate of metal material
11': Region formed only of metal material
13: Continuous phase of titanium-containing oxide

The invention claimed is:

1. An electronic component comprising:
a ceramic body; and
an external electrode on a surface of the ceramic body, the external electrode including:
a base layer in contact with the surface of the ceramic body, the base layer including a granulate of a metal material and a continuous phase present around the granulate of the metal material; and
a metal layer on the base layer,
wherein a density of the metal material in a first portion of the base layer closer to the metal layer is higher than a density of the metal material in a second portion of the base layer closer to the surface of the ceramic body, and
wherein the base layer has a thickness of 1.5 $\mu$m or less.

2. The electronic component according to claim 1, wherein the granulate of the metal material has a longitudinal direction dimension of 20 nm to 150 nm and a lateral direction dimension of 10 nm to 60 nm, and the lateral direction dimension is smaller than the longitudinal direction dimension.

3. The electronic component according to claim 1, wherein a thickness of the first portion of the base layer is 50% or less of a thickness of the base layer.

4. The electronic component according to claim 1, wherein the base layer further includes a region made of only the metal material in the first portion of the base layer closer to the metal layer, and a thickness of the region is in a range of 1% to 50% of a thickness of the base layer.

5. The electronic component according to claim 1, wherein the metal layer includes a nickel layer in contact with a surface of the base layer.

6. The electronic component according to claim 5, wherein the metal layer is a laminate including the nickel layer, a copper layer, and a tin layer in this order from the base layer.

7. The electronic component according to claim 1, wherein the metal material contains at least one selected from silver, copper, palladium, and gold.

* * * * *